(12) United States Patent
Kim et al.

(10) Patent No.: US 8,916,278 B2
(45) Date of Patent: Dec. 23, 2014

(54) HEAT TRANSFER MEMBER FOR BATTERY PACK

(75) Inventors: Heongsin Kim, Suwon-si (KR); Youngcheol Jang, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 124 days.

(21) Appl. No.: 12/840,462

(22) Filed: Jul. 21, 2010

(65) Prior Publication Data

US 2011/0039134 A1 Feb. 17, 2011

Related U.S. Application Data

(60) Provisional application No. 61/272,063, filed on Aug. 12, 2009.

(51) Int. Cl.

| | | |
|---|---|---|
| H01M 10/50 | (2006.01) | |
| H01M 2/34 | (2006.01) | |
| H01M 2/22 | (2006.01) | |
| H01M 10/613 | (2014.01) | |
| H01M 10/637 | (2014.01) | |
| H01M 10/647 | (2014.01) | |
| H01M 10/653 | (2014.01) | |
| H01M 10/6554 | (2014.01) | |
| H01M 2/10 | (2006.01) | |
| H01M 10/658 | (2014.01) | |

(52) U.S. Cl.
CPC ............. *H01M 2/348* (2013.01); *H01M 2/22* (2013.01); *H01M 2/34* (2013.01); *H01M 10/5004* (2013.01); *H01M 10/5026* (2013.01); *H01M 10/5032* (2013.01); *H01M 10/504* (2013.01); *H01M 10/5053* (2013.01); *H01M 2/1061* (2013.01); *H01M 10/5087* (2013.01); *H01M 2200/00* (2013.01); *H01M 2200/106* (2013.01)
USPC ........................................... 429/62; 429/163

(58) Field of Classification Search
CPC ................... H01M 10/5026; H01M 2200/106
See application file for complete search history.

(56) References Cited

U.S. PATENT DOCUMENTS 5,376,467 A * 12/1994 Abe et al. .......................... 429/7
5,788,855 A * 8/1998 Landolf ........................... 216/13

(Continued)

FOREIGN PATENT DOCUMENTS

| JP | 2003-308815 A | 10/2003 |
|---|---|---|
| JP | 2005-317454 A | 11/2005 |

(Continued)

OTHER PUBLICATIONS

European Extended Examination Report dated Nov. 3, 2010, in connection with corresponding Korean Patent Application No. 10-2010-0071339—6 pages.

(Continued)

*Primary Examiner* — Ula C Ruddock
*Assistant Examiner* — Scott J Chmielecki
(74) *Attorney, Agent, or Firm* — Knobbe, Martens, Olson & Bear LLP

(57) ABSTRACT

A battery pack includes a battery cell including a cell tab, a protective circuit board including an internal terminal coupled to the cell tab and a positive temperature coefficient (PTC) device connected to the internal terminal, and a heat transfer member contacting the cell tab. The heat transfer member may be attached to the cell tab as well as the PTC device. Heat generated in the battery cell, the cell tab, and the internal terminal is quickly transferred to the PTC device through the heat transfer member to quickly interrupt current flow when the battery cell is exposed to high temperature. Therefore, the battery pack may have the improved stability and reliability.

25 Claims, 7 Drawing Sheets

(56) References Cited

U.S. PATENT DOCUMENTS

| | | |
|---|---|---|
| 2002/0150815 A1* | 10/2002 | Ehara .............................. 429/90 |
| 2003/0157399 A1* | 8/2003 | Ikeuchi et al. .................. 429/62 |
| 2003/0185278 A1 | 10/2003 | Roepke et al. |
| 2005/0112456 A1 | 5/2005 | Kozu et al. |
| 2005/0156574 A1* | 7/2005 | Sato et al. ..................... 320/134 |
| 2005/0208345 A1* | 9/2005 | Yoon et al. ........................ 429/7 |
| 2006/0083984 A1* | 4/2006 | Oh et al. ....................... 429/176 |
| 2008/0008910 A1 | 1/2008 | Koh |
| 2008/0057383 A1 | 3/2008 | Seo et al. |

FOREIGN PATENT DOCUMENTS

| | | |
|---|---|---|
| JP | 2006-114475 A | 4/2006 |
| KR | 10-2003-0038560 A | 5/2003 |
| KR | 10-2004-0110661 | 12/2004 |
| KR | 10-0502354 B1 | 7/2005 |
| KR | 10-0760784 | 9/2007 |
| KR | 10-0760784 B1 | 9/2007 |
| KR | 10-0851963 | 8/2008 |
| KR | 10-0851963 B1 | 8/2008 |

OTHER PUBLICATIONS

Korean Office Action dated Oct. 24, 2011 of corresponding Korean Patent Application No. 10-2010-0071339—4 pages.

Japanese Office Action dated Oct. 30, 2012 of corresponding Japanese Patent Application No. 2010-179672—2 pages.

* cited by examiner

HEAT TRANSFER MEMBER FOR BATTERY PACK

CROSS-REFERENCE TO RELATED APPLICATION

This application claims the benefit of U.S. Provisional Application No. 61/272,063, filed Aug. 12, 2009, in the U.S. Patent and Trademark Office, the disclosure of which is incorporated herein by reference.

BACKGROUND

1. Field

Embodiments relate to a battery pack.

2. Description of the Related Art

Generally, battery packs include a rechargeable battery cell and a protective circuit module to prevent the battery cell from being overcharged or overdischarged. Lithium ion batteries or lithium polymer batteries may be used as battery cells. The protective circuit module includes a plurality of circuit devices to prevent the battery cell from being overcharged or overdischarged.

The lithium polymer batteries may be classified into an absolute solid type lithium polymer battery, which contains no organic electrolyte, and a lithium ion polymer battery, which includes a gel type polymer electrolyte containing an organic electrolyte.

In case of the lithium ion polymer battery, the leaking of the electrolyte is very low or does not occur when compared to the lithium ion battery using a liquid electrolyte. Thus, a pouch including a metal foil and an insulating layer instead of a metal can may be used as a battery sheath in the lithium ion polymer battery.

SUMMARY

Embodiments are directed to a battery pack in which heat generated from a battery cell, a cell tab, and an internal terminal is quickly transferred to a positive temperature coefficient (PTC) device to quickly interrupt current when the battery cell is exposed to a high temperature.

Aspects of the invention provide a battery pack including a battery cell including a cell tab; a protective circuit module including an internal terminal coupled to the cell tab and a positive temperature coefficient (PTC) device coupled to the internal terminal; and a heat transfer member contacting the cell tab.

According to aspects of the invention, the heat transfer member may contact the PTC device as well as the cell tab.

According to aspects of the invention, the battery pack may include a frame case disposed at least between the battery cell and the protective circuit board, wherein the heat transfer member is disposed between the frame case and the cell tab.

According to aspects of the invention, the heat transfer member may contact the frame case.

According to aspects of the invention, the heat transfer member may be spaced apart from the frame case.

According to aspects of the invention, the battery pack may include a frame case disposed at least between the battery cell and the protective circuit board, wherein the heat transfer member is disposed between the frame case and the cell tab and between the frame case and the PTC device.

According to aspects of the invention, the heat transfer member may transfer heat generated by current flowing between the cell tab and the internal terminal to the PTC device.

According to aspects of the invention, the heat transfer member contacts the internal terminal.

According to aspects of the invention, the heat transfer member may include a thermally conductive acrylic foam tape.

According to aspects of the invention, the thermally conductive acrylic foam tape may be ceramic particles, pressure sensitive acrylics, and/or a flame retardant.

According to aspects of the invention, the heat transfer member may include a heat conductive layer; an adhesive layer disposed between the heat conductive layer and the cell tab; and an adiabatic insulating layer disposed on the heat conductive layer facing the battery cell.

According to aspects of the invention, the heat transfer member may further include an adiabatic insulating layer disposed on the heat conductive layer facing the battery cell.

According to aspects of the invention, the adiabatic insulating layer may have a thermal conductivity from about 0.03 W/m-K to about 0.06 W/m-K.

According to aspects of the invention, the adiabatic insulating layer may include a foam polystyrene thermal insulation material, an extruded foam polystyrene board, glass wool, rock wool, a foam polyethylene thermal insulation material, a polyurethane foam, vermiculite, and/or perlite.

According to aspects of the invention, the heat transfer member may include a heat conductive layer; a first adhesive layer disposed between the heat conductive layer and the cell tab; and a second adhesive layer disposed on the heat conductive layer on a side opposite the first adhesive layer.

According to aspects of the invention, the protective circuit board may further include an insulating layer; internal and external interconnection patterns disposed respectively on internal and external sides of the insulating layer and coupled by a conduction via; and protective layers disposed to cover the interconnection patterns, wherein the internal terminal and PTC device are coupled via the internal interconnection patterns.

According to aspects of the invention, the internal terminal may extend beyond the edges of the cell tab, and the heat transfer member contacts the cell tab, the internal terminal, and protective layer.

According to aspects of the invention, the heat transfer member may contact the PTC device.

According to aspects of the invention, the heat transfer member may contact the cell tab, the internal terminal, and portions of the protective layer disposed adjacent to the cell tab and the internal terminal.

According to aspects of the invention, the heat transfer member may contact the cell tab, the internal terminal, the PTC device, and portions of the protective layer disposed adjacent to the cell tab, the internal terminal, and the PTC device.

Aspects of the invention provide a battery pack, including a protective circuit board, which includes a terminal disposed on one side of the protective circuit board, and a positive temperature coefficient (PTC) device disposed on the one side of the protective circuit board and coupled to the terminal; a battery cell having a cell tab, the cell tab connected to the terminal and coupled between an electrode of the battery cell and the terminal; and a heat transfer member contacting the cell tab.

According to aspects of the invention, the cell tab may be disposed on the terminal between the terminal and the battery cell.

According to aspects of the invention, the heat transfer member may be disposed on both the cell tab and the PTC device.

According to aspects of the invention, the terminal may extend beyond at least an edge of the cell tab, and the heat transfer member contacts both the cell tab and the terminal.

According to aspects of the invention, the heat transfer member may contact portions of the protective circuit board adjacent to the cell tab and the PTC device.

According to aspects of the invention, the terminal may extend beyond at least an edge of the cell tab, and the heat transfer member contacts the cell tab, the terminal, the PTC device, and portions the protective circuit board adjacent to the cell tab, the terminal, and the PTC device.

According to aspects of the invention, the battery pack may include a frame case disposed between the battery cell and the protective circuit board.

According to aspects of the invention, the heat transfer member may contact the frame case.

According to aspects of the invention, the heat transfer member may be spaced apart from the frame case.

According to aspects of the invention, the heat generated in the battery cell, the cell tab, and the internal terminal is quickly transferred to the PTC device through the heat transfer member to quickly interrupt current when the battery cell is exposed to a high temperature. Therefore, the battery pack according to the embodiments may have the improved stability and reliability.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
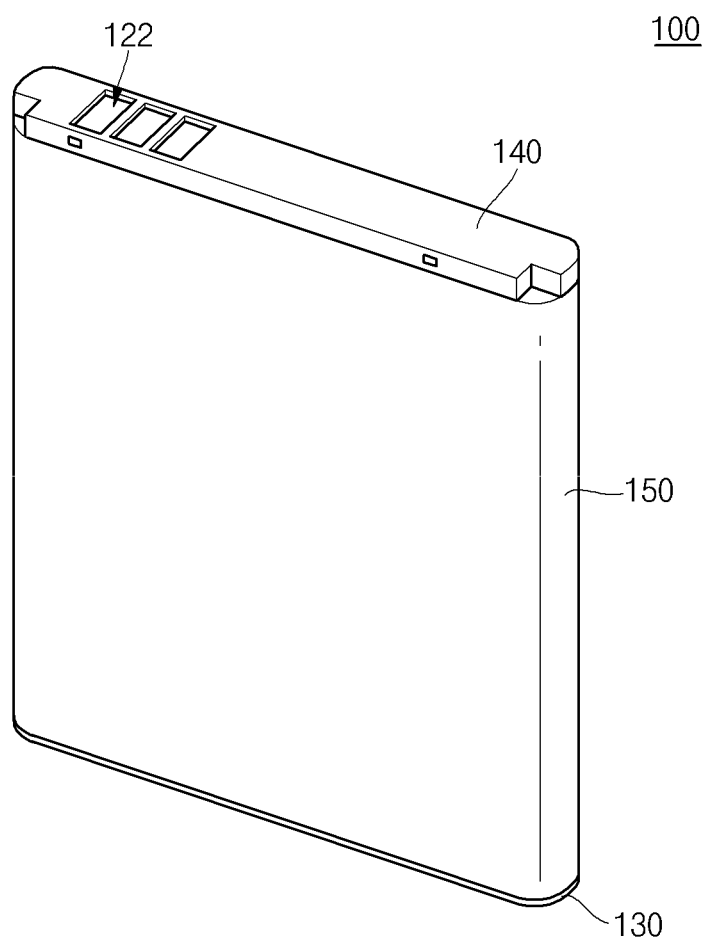
FIG. 1A illustrates an assembled perspective view of a battery pack according to an embodiment.

Example embodiments will now be described more fully hereinafter with reference to the accompanying drawings, wherein like reference numerals refer to the like elements throughout; however, aspects of the invention may be embodied in different forms and should not be construed as limited to the embodiments set forth herein. Rather, these embodiments are provided so that this disclosure will be thorough and complete, and will fully convey the scope of the invention to those skilled in the art. It will be understood that when an element such as a layer, film, region, or substrate is referred to as being "coupled to" another element, it can be electrically or physically coupled directly to the other element, or intervening elements may also be present. In contrast, when an element is referred to as being "coupled directly to" another element, there are no intervening elements present.

Figure 1B:
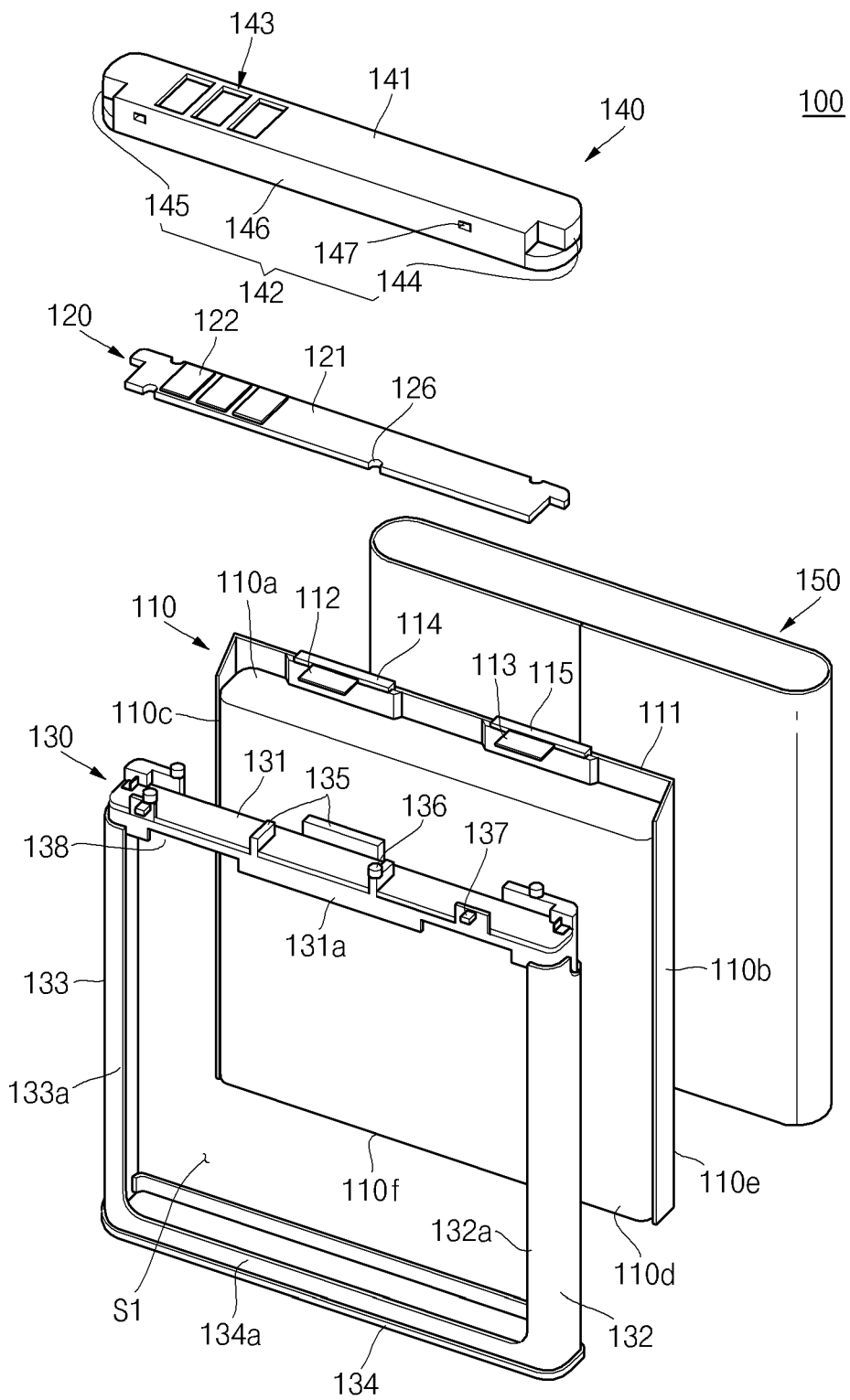
FIG. 1B illustrates an exploded perspective view of the battery pack of FIG. 1A.

FIG. 1A illustrates an assembled perspective view of a battery pack 100 according to an embodiment, and FIG. 1B illustrates an exploded perspective view of the battery pack 100 of FIG. 1A. Referring to FIGS. 1A and 1B, the battery pack 100 includes a battery cell 110, a protective circuit module 120, a frame case 130, a cover 140, and a label 150.

An electric charge is stored in and/or discharged from the battery cell 110. The battery cell 110 may be classified into a can type battery cell or a pouch type battery cell according to a material of a case surrounding an electrode assembly. The pouch type battery cell will be described in this embodiment as an example; however, aspects of the invention are not limited thereto.

The battery cell 110 includes an electrode assembly (not shown), cell tabs 112 and 113, and a pouch case 111. The electrode assembly includes a positive electrode, a negative electrode, and a separator disposed between the positive electrode and the negative electrode. An electrolyte, such as a solid, liquid, and/or gel electrolyte, is disposed in the electrode assembly. The cell tabs 112 and 113 are respectively connected to the positive electrode and the negative electrode of the electrode assembly. The electrode assembly is disposed in the pouch case 111 such that the cell tabs 112 and 113 are exposed to an outside of the pouch case 111. The cell tabs 112 and 113 extend out of the pouch case 111 and are bent to be connectable to the protective circuit module 120. As shown, insulating tapes 114 and 115 are disposed on the cell tabs 112 and 113, respectively, to prevent the electrode tabs 112 and 113 from electrically short-circuiting via the pouch case 111. However, the tapes 114, 115 need not be used in all aspects.

The battery cell 110 has a top surface 110a, a pair of short side surfaces 110b and 110c, a pair of long side surfaces 110d and 110e, and a bottom surface 110f. The circuit module 120 is disposed on the top surface 110a. The pair of short side surfaces 110b and 110c and the pair of long side surfaces 110d and 110e are connected to the top surface 110a. The bottom surface 110f faces the top surface 110a and is connected to the side surfaces 110b, 110c, 110d, and 110e. Here, the pair of short side surfaces 110b and 110c denotes side surfaces having a relatively narrow width among the side surfaces 110b, 110c, 110d, and 110e connected to the top surface 110a of the battery cell 110. The pair of long side surfaces 110d and 110e denotes side surfaces having a relatively wide width among the side surfaces 110b, 110c, 110d, and 110e of the battery cell 110.

The protective circuit module 120 is disposed on the top surface 110a of the battery cell 110. The protective circuit module 120 is coupled to the battery cell 110 to control the charging and discharging of the battery cell 110. The shown protective circuit module 120 includes a circuit board 121, external terminals 122, internal terminals (not shown), a positive temperature coefficient (PTC) device (not shown), and a coupling groove 126.

The external terminals 122 are disposed on a top surface of the circuit board 121 to electrically connect the circuit board 121 to an external electric device (not shown). The coupling groove 126 is formed in a periphery of a long side of the circuit board 121 to physically couple the protective circuit module 120 to the frame case 130. The protective circuit module 120 will be described below in detail.

The frame case 130 is disposed about at least a portion of the battery cell 110 between the battery cell 110 and the protective module 120, i.e., is disposed at least on the top surface 110a of the battery cell 110, and is physically coupled to the protective circuit module 120. The frame case 130 covers the top surface 110a, the bottom surface 110f, and the pair of short side surfaces 110b and 110c of the battery cell 110, respectively, but aspects of the invention are not limited thereto. Also, the frame case 130 exposes the pair of long side surfaces 110d and 110e of the battery cell 110 to the outside and covers lateral edge portions of the pair of long side surfaces 110d and 110e, but aspects of the invention are not limited thereto. Thus, the frame case 130 has a receiving space S1 in which the battery cell 110 is disposed.

Specifically, the frame case 130 includes planar parts 131, 132, 133, and 134 and extension surfaces 131a, 132a, 133a, and 134a. The planar parts 131, 132, 133, and 134 cover the top surface 110a, the pair of short side surfaces 110b and 110c, and the bottom surface 110f, respectively. The extension surfaces 131a, 132a, 133a, and 134a extend from the planar parts 131, 132, 133, and 134 parallel to edge portions of the pair of long side surfaces 110d and 110e of the battery cell 110 and extend toward a center of the long side surfaces 110d and 110e of the battery cell 110 to cover the edge portions of the pair of long side surfaces 110d and 110e of the battery cell 110. The extension surfaces 131a, 132a, 133a, and 134a may be bent end portions of the planar parts 131, 132, 133, and 134, respectively.

The shown frame case 130 includes a support part 135 disposed on the planar part 131, a coupling protrusion 136, and a rib 137. Each support part 135 protrudes from the planar part 131 toward the protective circuit module 120. The support parts 135 may be disposed at an edge of the planar part 131 and/or in a middle region of the planar part 131. The support part 135 supports the protective circuit module 120 when the protective circuit module 120 is disposed above the planar part 131 to provide a space between the planar part 131 and the protective circuit module 120. The cell tabs 112 and 113, the internal terminals (not shown), and the positive temperature coefficient (PTC) device (not shown) are disposed in the provided space.

The coupling protrusion 136 protrudes from the support part 135 toward the protective circuit module 120 and corresponds to or aligns with the coupling groove 126 of the protective circuit module 120. The coupling protrusion 136 is inserted into the coupling groove 126 to physically couple the protective circuit module 120 to the frame case 130.

The rib 137 protrudes from a lateral surface of the support part 135. The rib 137 is inserted into a rib coupling hole 147 of the cover 140, which will be described later, to physically couple the frame case 130 to the cover 140.

The frame case 130 including the above-described components may be integrally formed by an injection molding process; however, aspects are not limited thereto such that the frame case 130 may be modularly formed. The frame case 130 may be formed of one of polycarbonate (PC), polyethylene terephthalate glycol (PETG), polyethylene (PE), polypropylene (PP), acronitrile-butadiene-styren (ABS), and mixtures thereof, but aspects are not limited thereto.

The cover 140 is coupled to an upper portion of the battery cell 110 to cover the protective circuit module 120 disposed in an inner space between the planar part 131 of the frame case 130 and the cover 140. The cover 140 includes a cover plate 141 and a sidewall 142 extending from the cover plate 141 toward the protective circuit module 120. The shown cover plate 141 has a shape approximately similar to that of the circuit board 121. An inner surface of the cover plate 141 may contact the top surface of the circuit board 121. Through holes 143 are defined in a region of the cover plate 141 corresponding to the external terminals 122, i.e., the through holes 143 align with the external terminals 122. The through holes 143 expose the external terminals 122 to the outside to electrically connect the battery pack 100 to an external electric device (not shown).

The side wall 142 includes end parts 144 and 145 disposed respectively on ends of the cover 140, the ends being disposed oppositely in a longitudinal direction of the cover 140. The sidewall 142 further includes connection parts 146 which connect the end part 144 to the end part 145 along both sides of the cover 140. Here, both end parts 144 and 145 and portions of the connection parts 146 may be covered by the label 150; however, aspects are not limited thereto such that the label 150 may not extend to cover portions of the cover 140 and need not even be used in all aspects.

Also, the side wall 142 may include the rib coupling hole 147 defined in a region of the respective connection parts 146 corresponding to the rib 137 of the frame case 130 so as to align therewith. However, aspects are not limited thereto such that the rib couple hole 147 need not be a hole through the side wall 142 but may be a protrusion to receive the rib 137. The rib 137 of the frame case 130 is inserted into the rib coupling hole 147 to physically couple the frame case 130 to the cover 140.

The label 150 is attached to the side surfaces 110b, 110c, 110d, and 110e of the battery cell 110. The shown label 150 covers portions of the both end parts 144 and 145 of the cover 140 and portions of the connection parts 146. The label 150 may improve coupling between the battery cell 110, the frame case 130, and the cover 140.

Figure 2:
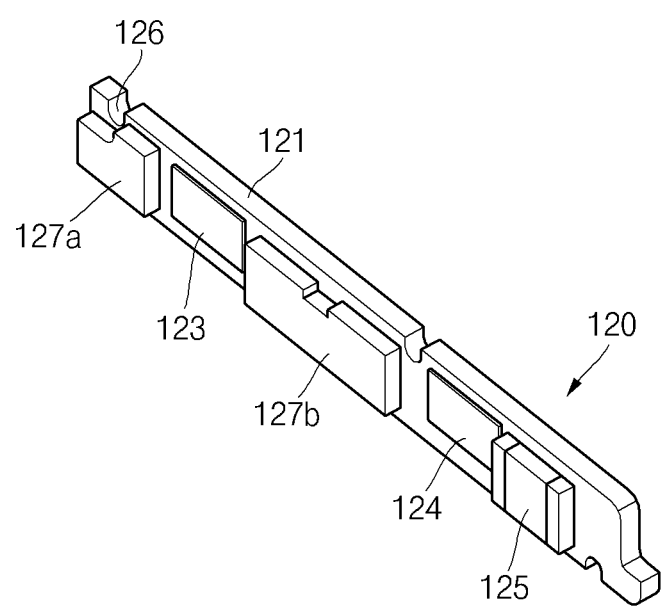
FIG. 2 illustrates a rear perspective view of a protective circuit module of a battery pack according to an embodiment.

FIG. 2 illustrates a bottom perspective view of a protective circuit module 120 of a battery pack 100 according to an embodiment. Referring to FIG. 2, the circuit board 121 is provided with an insulating layer 121a. The circuit board 121 includes a circuit 127a that detects a charge voltage, a discharge voltage, and a current of a battery cell 110 and a switch 127b that interrupts a current when an overcharge voltage, an overdischarge voltage, or an overcurrent condition is detected.

Internal terminals 123 and 124 are disposed on the circuit board 121 on a side thereof facing the battery cell 110. The internal terminals 123 and 124 may be coupled to cell tabs of the battery cell 110 by direct welding. Here, the internal terminal 123 and the cell tab 112 may be coupled to a positive interconnection pattern (not shown), and the internal terminal 124 and the cell tab 113 may be coupled to a negative interconnection pattern (not shown) of the protective circuit module 120 via a positive temperature coefficient (PTC) device 125.

The PTC device 125 is mounted on the circuit board 121. The PTC device 125 is coupled to the internal terminal 124 to interrupt a current when a temperature of the battery cell 110 is beyond a predetermined temperature, thereby preventing abnormal behavior due to overheating of the battery cell from occurring. However, aspects are not limited thereto such that the PTC device 125 may be connected to the internal terminal 123 instead of the internal terminal 124.

Moreover, the PTC device 125 has a room temperature resistance of several hundred ohms, and an operation temperature of about 75° C. to about 120° C. The PTC device 125 may include a chip PTC thermister that can be surface mounted on the circuit board 121, but aspects are not limited thereto.

Although being described below in detail in relation to FIG. 6, a heat transfer member (not shown) may be integrally attached to the cell tab, the internal terminal 124, and the PTC device 125 to quickly transfer heat generated in the cell tab and the internal terminal 124 to the PTC device 125.

Figure 3A:
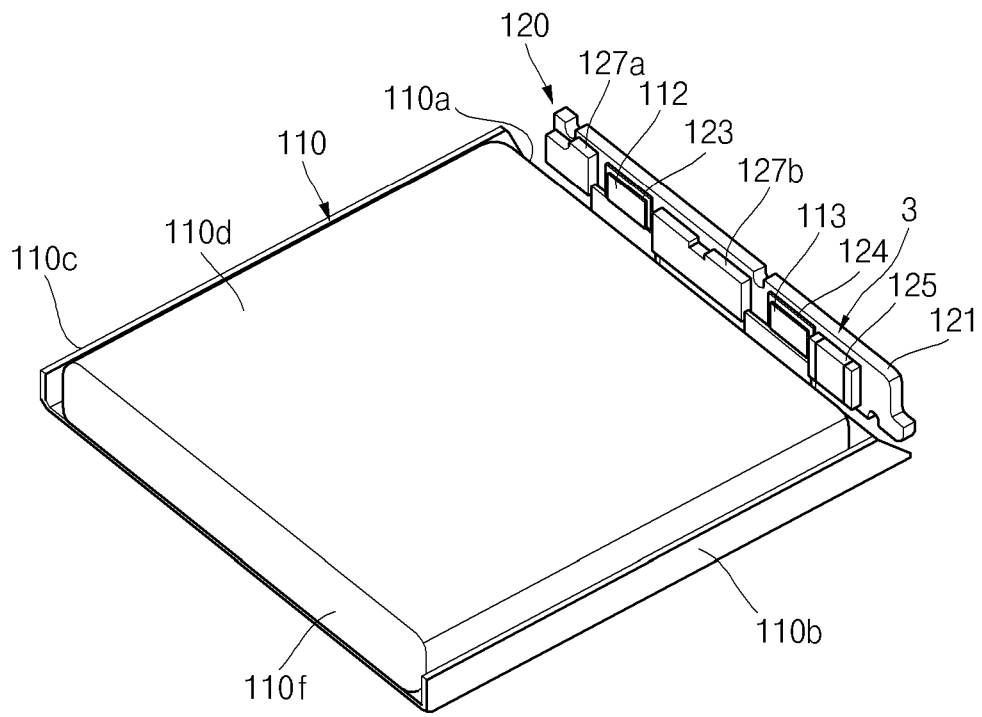
FIG. 3A illustrates a perspective view of a state in which a battery cell and a protective circuit module are coupled to each other in a battery pack according to an embodiment.
Figure 3B:
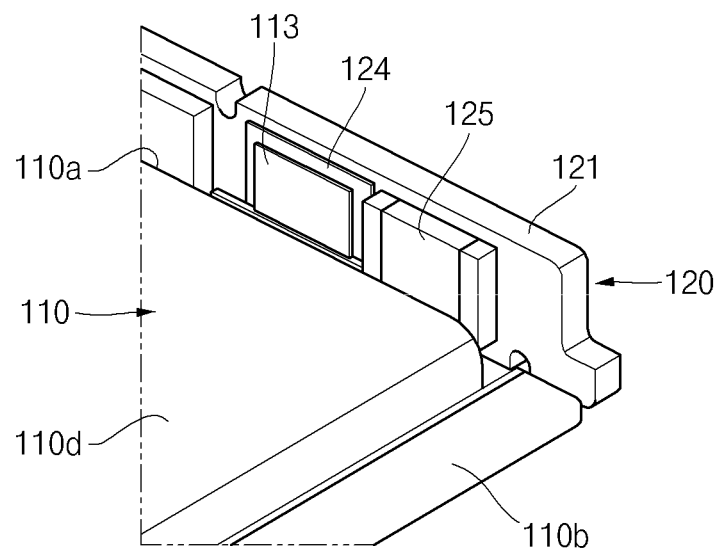
FIG. 3B illustrates an enlarged perspective view of a region 3 of FIG. 3A.

FIG. 3A illustrates a perspective view in which a battery cell 110 and a protective circuit module 120 are coupled to each other in a battery pack 100 according to an embodiment. FIG. 3B illustrates an enlarged perspective view of a region 3 of FIG. 3A. Referring to FIGS. 3A and 3B, the cell tab 112 of the battery cell 110 is connected to the internal terminal 123. The internal terminal 123 is disposed on a circuit board 121 of a protective circuit module 120. For example, the cell tab 112 may be connected to the internal terminal 123 by ultrasonic welding, resistance welding, or laser welding, but aspects are not limited thereto. Also, the cell tab 113 of the battery cell 110 is connected to an internal terminal 124. The internal terminal 124 is disposed on the circuit board 121 of the protective circuit module 120. For example, the cell tab 113 may be connected to the internal terminal 124 by ultrasonic welding, resistance welding, or laser welding, but aspects are not limited thereto. Although not visible in FIGS. 3A and 3B, the cell tabs 112 and 113 extend out of the pouch case 111 past the planar part 131 of the frame case 130 and are bent into an L shape to be connected to the internal terminals 123 and 124 forming a gap between the planar part 131 and the cell tabs 112 and 113.

Since the PTC device 125 is electrically connected and coupled to the internal terminal 124, and the internal terminal 124 is coupled to the cell tab 113, the PTC device 125 is coupled to the cell tab 113.

Referring to FIGS. 1B, 3A, and 3B, a planar part 131 of FIG. 1B of the frame case 130 is disposed between the battery cell 110 and the protective circuit module 120. Since the frame case 130 is formed of a resin having a low thermal conductivity, heat of the battery cell 110 is not quickly transferred to the PTC device 125. Thus, when a temperature of the battery cell 110 is beyond its allowable temperature, the PTC device 125 may not be quickly operated.

Figure 4A:
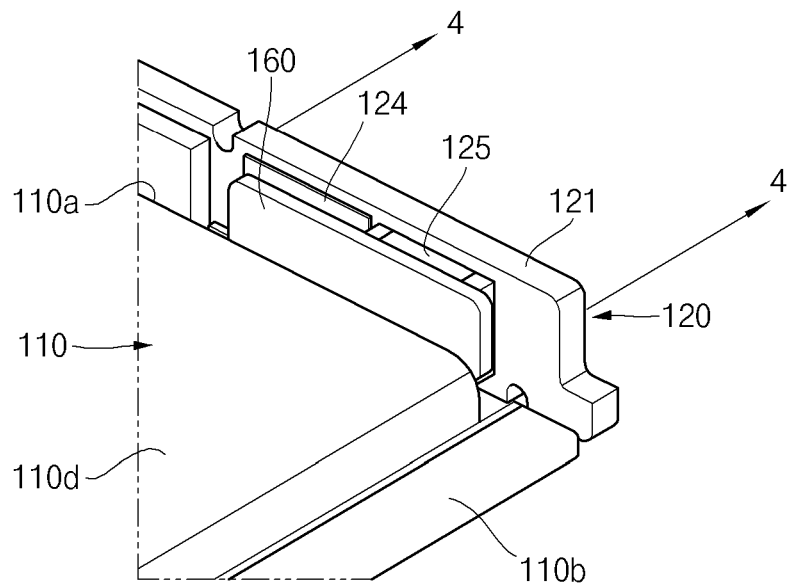
FIG. 4A illustrates a partially enlarged perspective view of a state in which a heat transfer member is attached to a cell tab and a positive temperature coefficient (PTC) device in a battery pack according to an embodiment.
Figure 4B:
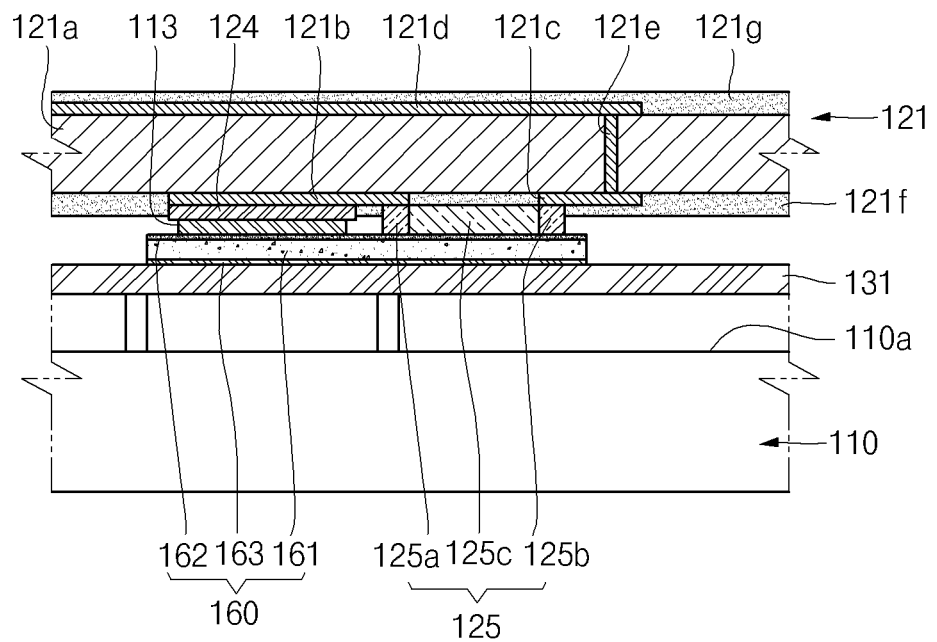
FIG. 4B illustrates a cross-sectional view taken along line 4-4 of FIG. 4A.

FIG. 4A illustrates a partially enlarged perspective in which a heat transfer member is attached to the cell tab 113 (not shown) and the positive temperature coefficient (PTC) device 125 in the battery pack 100 according to an embodiment, and FIG. 4B illustrates a cross-sectional view taken along line 4-4 of FIG. 4A. Here, for convenience of comprehension, the frame case 130 is not illustrated in FIG. 4A, and the planar part 131 of the frame case is illustrated in FIG. 4B.

Referring to FIGS. 4A and 4B, the cell tab 113 is connected to the internal terminal 124. Although not visible in FIGS. 4A and 4B, the cell tab 113 extends out of the pouch case 111 past the planar part 131 of the frame case 130 and is bent into an L shape to be connected to the internal terminal 124 forming a gap between the planar part 131 and the cell tab 113. The heat transfer member 160 is attached to the cell tab 113 and the PTC device 125 within said gap. The shown heat transfer member 160 has an integrated plate shape, but aspects are not limited thereto. When a current flows from the cell tab 113 to the internal terminal 124 or from the internal terminal 124 to the cell tab 113, a relatively large contact resistance occurs in a contact region of the cell tab 113 and the internal terminal 124. As a result, a large amount of heat is generated in the contact region. Specifically, when an overcurrent flows and generates heat in the battery cell 110, the cell tab 113 and the internal terminal 124 generate a large amount of heat. In this case, the heat generated in the cell tab 113 and the internal terminal 124 is quickly and directly transferred to the PTC device 125 through the heat transfer member 160. Thus, although the planer part 131, which has a poor thermal conductivity, is disposed between the battery cell 110 and the PTC device 125, the PTC device 125 may be quickly operated because the heat generated in the cell tab 113 and the internal terminal 124 is directly transferred to the PTC device 125 through the heat transfer member 160. That is, when the battery cell is overheated, the current is quickly interrupted. Thus, the stability and reliability of the battery cell 110 are improved. Moreover, one surface of the heat transfer member 160 may be attached or closely adhere to the cell tab 113, the internal terminal 124, and the PTC device 125, and the other surface of the heat transfer member 160 may closely adhere to or be spaced from the planar part 131 of the frame case. The heat transfer member 160 may closely adhere to the planar part 131 of the frame case to improve thermosensitivity with respect to the battery cell 110.

Referring to FIG. 4B, the circuit board 121 includes an insulating layer 121a having a plate shape, interconnection patterns 121b, 121c, and 121d disposed on surfaces of the insulating layer 121a, a conductive via 121e electrically connecting the interconnection pattern 121c to the interconnection pattern 121d disposed on opposite surfaces of the insulating layer 121a from each other, and protection layers 121f and 121g that cover the interconnection patterns 121b, 121c, and 121d. Here, although the double-layered circuit board 121 is described as an example, the circuit board 121 is not limited thereto. For example, the circuit board 121 may have a multi-layered structure.

The internal terminal 124 is connected to the interconnection pattern 121b. Also, the cell tab 113 is connected to the internal terminal 124. The PTC device 125 includes terminals 125a and 125b and a PTC device material 125c. The terminal 125a is connected to the interconnection pattern 121b, and the other terminal 125b is connected to the interconnection pattern 121c. Moreover, although not shown, the interconnection pattern 121d may be coupled to an external terminal (e.g., a negative terminal). The internal terminal 124 may be integrally formed with the interconnection pattern 121b. Also, a plating layer may be thickly coated on the interconnection pattern 121b to form the internal terminal 124.

According to the above-described structure, the heat generated in the cell tab 113 and the internal terminal 124 may be transferred to the PTC device 125 through the interconnection pattern 121b. However, since the interconnection pattern 121b has a thin thickness, a large amount of heat is not effectively transferred through the interconnection pattern 121b when compared to the heat transfer member 160. While not required, the interconnection pattern 121b may have a relatively thick thickness to improve heat transfer efficiency through the interconnection pattern 121b.

The heat is transferred to the PTC device 125 through three paths. Firstly, the heat is transferred to the PTC device 125 from the battery cell 110 through the planar part 131 of the frame case 130. Secondly, the heat is transferred to the PTC device 125 from the cell tab 113 and the internal terminal 124 through the interconnection pattern 121b. Thirdly, the heat is transferred to the PTC device 125 from the cell tab 113 and the internal terminal 124 through the heat transfer member 160. Among these, when the heat is transferred through the heat transfer member 160, heat transfer efficiency is the most efficient. Next, when the heat is transferred through the interconnection pattern 121b and the planar part 131 of the frame case, heat transfer is efficient.

The heat transfer member 160 may include any member that is electrically insulative and thermally conductive. For example, the heat transfer member 160 may include a thermally conductive acrylic foam tape including ceramic particles, pressure sensitive acrylics, and flame retardants, but aspects are not limited thereto. Also, the heat transfer member 160 may include a heat conductive layer 161 and an adhesive layer 162. That is, since the heat conductive layer 161 may not be adhesive, the thin adhesive layer 162 may be disposed on a surface of the heat conductive layer 161. The adhesive layer 162 may be disposed on one surface or both side surfaces of the heat conductive layer 161. That is, the heat transfer member 160 may have double-sided adhesive tape shape in which the adhesive layers 162 are disposed on the both side surfaces of the heat conductive layer 161.

Referring to FIG. 4B, the adhesive layer 162 is disposed on only one surface of the heat conductive layer 161 to attach the heat transfer member 160 to the cell tab 113 and the PTC device 125. Additionally, an adiabatic insulating layer 163 is further disposed on the heat transfer member 160. The adiabatic insulating layer 163 prevents heat from being dissipated to the outside after the heat is absorbed from the cell tab 113 into the heat conductive layer 161. Thus, the heat absorbed through the cell tab 113 remains in the heat conductive layer 161 for a time to further improve thermal conductivity at the PTC device 125. The adiabatic insulating layer 163 may be formed of a material having thermal conductivity of about 0.03 W/m-k to about 0.06 W/m-k. For example, the adiabatic insulating layer 163 may be formed of a foam polystyrene thermal insulation material, an extruded foam polystyrene board, a thermal insulation material made of glass wool, a thermal insulation material made of rock wool, a foam polyethylene thermal insulation material, a polyurethane foam, a vermiculite, a perlite (pearl stone), and combinations and equivalents thereof, but is not limited thereto. In addition, when it is intended to effectively transfer the heat transferred from the battery cell 110 through the planar part 131 to the heat transfer member 160, the adiabatic insulating layer 163 may be omitted. Also, the adiabatic insulating layer 163 may be omitted in the following description.

The shown heat transfer member 160 includes the heat conductive layer 161 and the adhesive layer 162. One of commercial models from the Korean company Samdo Ind.: SD-AT090, SD-AT040C, SD-AT045, STC-2400, and STC-2250 may be used as the heat transfer member 160. For example, physical properties of STC-2250 are as follows.

The HCR was measured by attaching a 25 mm×25 mm sample to a SUS (stainless steel plane), suspending a 500-g weight from the sample, and increasing the temperature at a rate of 10° C./20 minutes. Then, when the weight falls, the temperature or slipping distance was measured.

As shown above, the heat transfer member 160 has high thermal conductivity (K>0.8 W/m-K), low heat resistance, uniform heat distribution properties (temperature uniformity), and high mechanical strength (shear and tensile strength) at high temperatures. In addition, the adhesive strength of the heat transfer member 160 may be well maintained at high temperatures.

Therefore, when the cell tab 113 and the internal terminal 124 are heated due to an overcurrent, heat may be quickly transferred to the PTC device 125 through the heat transfer member 160 of which the mechanical strength and adhesive strength are not reduced at high temperatures.

Figure 5:
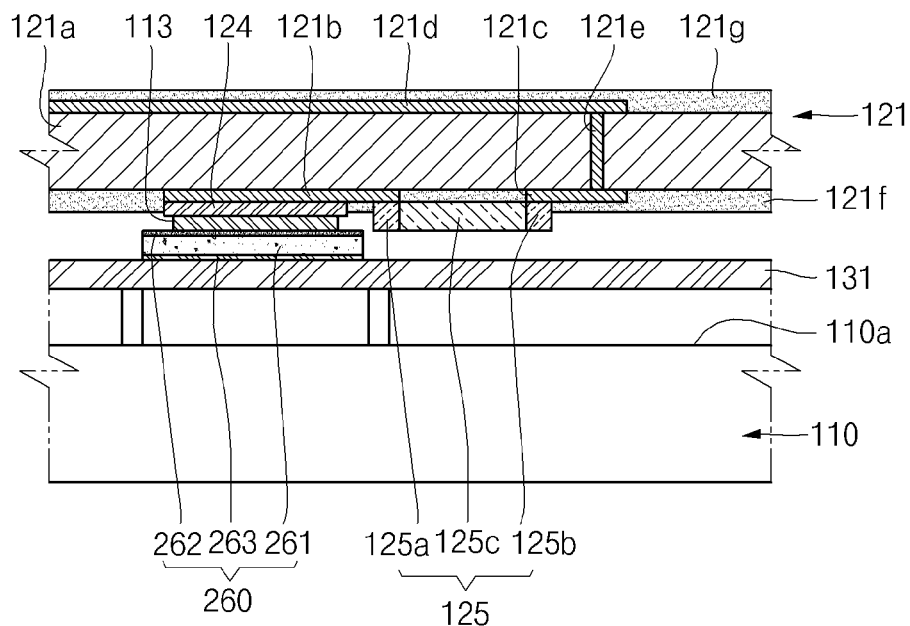
FIG. 5 illustrates a cross-sectional view of an attachment state of a heat transfer member according to another embodiment.

FIG. 5 illustrates a cross-sectional view of an attachment state of a heat transfer member according to another embodiment. Referring to FIG. 5, a heat transfer member 260 is attached to only a cell tab 113. That is, the heat transfer member 260 includes an adhesive layer 262, a heat conductive layer 261, and an adiabatic insulating layer 263. The heat transfer member 260 is attached to only the cell tab 113, leaving a gap between the heat transfer member 260 and the PTC device 125.

In detail, the adhesive layer 262 is attached to only the cell tab 113, and the heat conductive layer 261 is disposed on the surface of the adhesive layer 262. The adiabatic insulating layer 263 is disposed on the heat conductive layer 261. Therefore, although the heat transfer member 260 absorbs heat from the cell tab 113, the heat is not well dissipated to the outside. As a result, heat generated at the cell tab 113 is transferred to the PTC device 125 mainly through an interconnection pattern 121b. That is, since the heat transfer member 260 does not directly connect the cell tab 113 and the PTC device 125 at the same time, heat accumulated in the heat transfer member 260 is transferred to the PTC device 125 through the interconnection pattern 121b that electrically connects the cell tab 113 to the PTC device 125.

Figure 6:
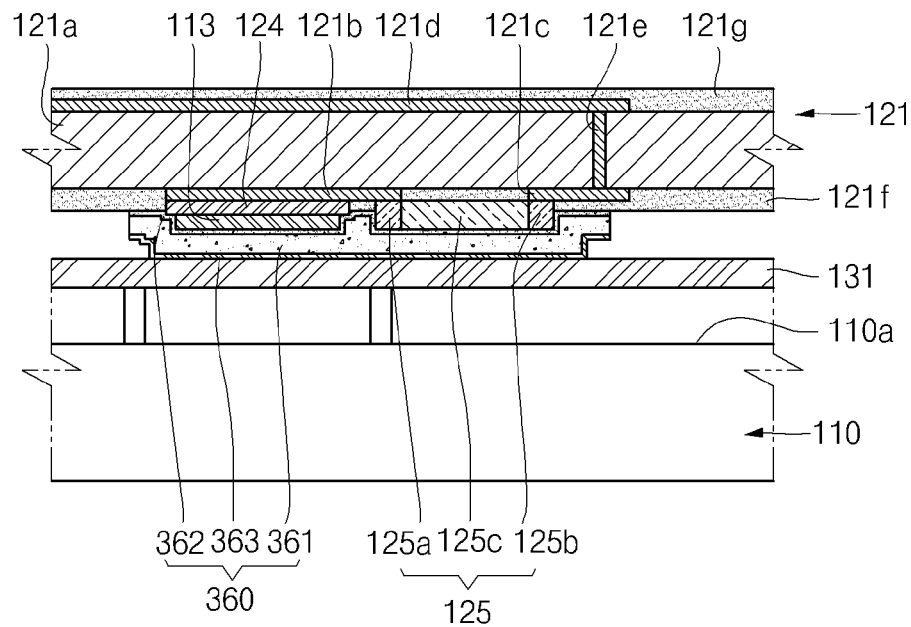
FIG. 6 illustrates a cross-sectional view of an attachment state of a heat transfer member according to another embodiment.

FIG. 6 illustrates a cross-sectional view of a heat transfer member 360 according to another embodiment. Referring to FIG. 6, the heat transfer member 360 completely covers a cell tab 113, the internal terminal 124, and the PTC device 125. In addition, the heat transfer member 360 covers a portion of the circuit board 121 corresponding to peripheries of the cell tab 113, the internal terminal 124, and the PTC device 125.

In more detail, an adhesive layer 362 is attached to the cell tab 113, the internal terminal 124, the PTC device 125, and

TABLE 1

| Color | Thickness mm | Tensile Strength kg/cm$^2$ | Elongation % | Initial Adhesive Strength g/cm | Normal Adhesive Strength g/cm | HCR* ° C. | Thermal Conductivity W/m-K |
|---|---|---|---|---|---|---|---|
| White | 0.25 | 12.4 | 260 | 375 | 650 | ≥110 | 0.8 |

*HCR: Heat Creep Resistance

In Table 1, the initial adhesive strength was measured by a 180-degree pulling separation method based on KSA 1529 (Korean industrial standards). The parameters used in the method are as follows: Wait time: 30 minutes; Measurement Speed: 300 mm/min; and Measurement Width: 10 mm. The normal adhesive strength was measured by the same method except that the wait time was one day (24 hours).

portions of the circuit board 121 about the cell tab 113, the internal terminal 124, and the PTC device 125. A heat conductive layer 361 is disposed on the adhesive layer 362. An adiabatic insulating layer 363 is disposed on the heat conductive layer 361. In this way, the surfaces of the cell tab 113, the internal terminal 124, the PTC device 125, and portions of the circuit board 121 about the cell tab 113, the internal terminal 124, and the PTC device 125 are completely covered with the adhesive layer 362, the heat conductive layer 361, and the adiabatic insulating layer 363. Therefore, heat transfer from the cell tab 113 to the PTC device 125 may be efficiently performed through the heat conductive layer 361, and heat is not dissipated from the heat conductive layer 361 to the outside area because of the adiabatic insulating layer 363.

As such, the PTC device 125 may be sensitively operated in response to heat generated from the cell tab 113. When the surfaces of the cell tab 113 and the PTC device 125 are substantially covered with the heat transfer member 360, the heat transfer efficiency of the heat transfer member 360 may be optimal.

Figure 7:
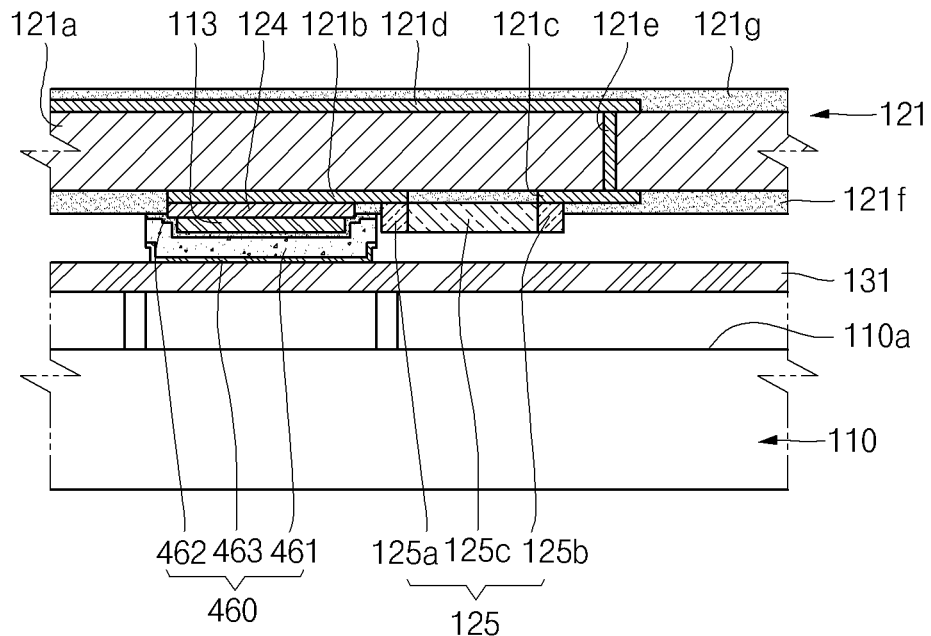
FIG. 7 illustrates a cross-sectional view of an attachment state of a heat transfer member according to another embodiment.

FIG. 7 illustrates a cross-sectional view of a heat transfer member 460 according to another embodiment. Referring to FIG. 7, the heat transfer member 460 completely covers only the cell tab 113 and the internal terminal 124. Also, the heat transfer member 460 covers a portion of the circuit board 121, i.e., about a periphery of the cell tab 113 and the internal terminal 124. A gap exists between the heat transfer member 460 and the PTC device 125.

In detail, an adhesive layer 462 is attached to the cell tab 113, the internal terminal 124, and the circuit board 121 at portions thereof adjacent to the cell tab 113 and internal terminal 124. Also, a heat conductive layer 461 is disposed on the adhesive layer 462. An adiabatic insulating layer 463 is disposed on the heat conductive layer 461. Thus, heat generated in the cell tab 113 is absorbed through the heat conductive layer 461 and is prevented from dissipating to the outside of the heat transfer member 460 by the adiabatic insulating layer 463. Therefore, the heat generated from the cell tab 113 is quickly transferred to the PTC device 125 through the interconnection pattern 121b.

Figure 8:
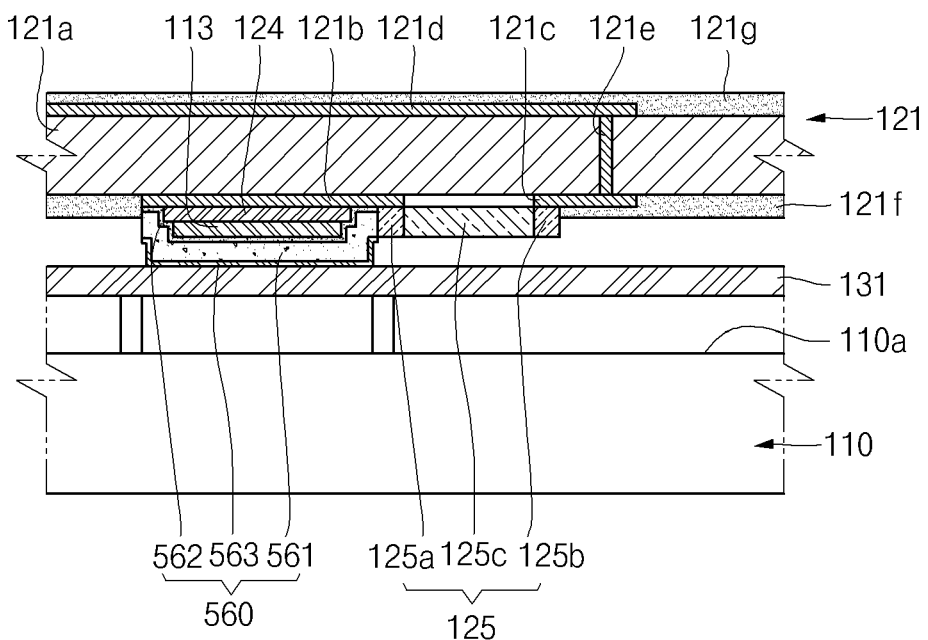
FIG. 8 illustrates a cross-sectional view of an attachment state of a heat transfer member according to another embodiment.

FIG. 8 illustrates a cross-sectional view of a heat transfer member according to another embodiment. Referring to FIG. 8, the heat transfer member 560 covers the cell tab 113, the internal terminal 124, and the interconnection pattern 121b disposed outside the internal terminal 124, i.e., at a periphery of the internal terminal 124. In detail, the protection layer 121f does not cover the interconnection pattern 121b corresponding to the periphery of the internal terminal 124. Therefore, the interconnection pattern 121b is exposed so that the heat transfer member 560 is disposed thereon.

An adhesive layer 562 of the heat transfer member 560 is attached to the cell tab 113, the internal terminal 124, and the interconnection pattern 121b. Also, a heat conductive layer 561 is disposed on the adhesive layer 562. An adiabatic insulating layer 563 is disposed on the heat conductive layer 561. Further, the heat transfer member 560 may or may not be disposed to contact the PTC 125. Thus, heat generated in the cell tab 113 is rapidly transferred to the interconnection pattern 121b through the heat transfer member 560, and the heat is rapidly transferred to the PTC device 125 through the interconnection pattern 121b.

Exemplary embodiments have been disclosed herein, and although specific terms are employed, they are used and are to be interpreted in a generic and descriptive sense only and not for purpose of limitation. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack, comprising:
a battery cell;
a protective circuit board comprising an internal terminal and a positive temperature coefficient (PTC) device;
a cell tab electrically coupled to the battery cell, the cell tab contacting the internal terminal of the protective circuit board, the cell tab comprising a cell tab surface facing the battery cell;
the PTC device comprising a PTC surface facing the battery cell; and
an electrically-insulating heat-transfer member interposed between the battery cell and the protective circuit board, the electrically-insulating heat-transfer member contacting the cell tab surface and the PTC surface, thereby providing a thermal connection between the cell tab surface and the PTC surface both facing the battery cell while electrically insulating the cell tab surface from the PTC surface,
wherein the internal terminal extends beyond at least an edge of the cell tab, and the electrically-insulating heat-transfer member contacts both the cell tab and the internal terminal.

2. The battery pack of claim 1, wherein the heat transfer member is disposed between a frame case and the cell tab.

3. The battery pack of claim 2, wherein the heat transfer member contacts the frame case.

4. The battery pack of claim 1, wherein the heat transfer member is disposed between a frame case and the cell tab and between the frame case and the PTC device.

5. The battery pack of claim 4, wherein the heat transfer member contacts the frame case.

6. The battery pack of claim 1, wherein the heat transfer member transfers heat generated by current flowing between the cell tab and the internal terminal to the PTC device.

7. The battery pack of claim 1, wherein the heat transfer member comprises:
a heat conductive layer interposed between the cell tab surface and the battery cell, the heat conductive layer having a first heat conductivity;
a first adhesive layer interposed between the heat conductive layer and the cell tab; and
a second adhesive layer interposed between the heat conductive layer and the battery cell, the second adhesive layer having a second heat conductivity substantially lower than the first heat conductivity.

8. The battery pack of claim 1, wherein the protective circuit board further comprises:
an insulating layer;
internal and external interconnection patterns disposed respectively on internal and external sides of the insulating layer and coupled by a conduction via; and
protective layers disposed to cover the interconnection patterns,
wherein the internal terminal and PTC device are coupled via the internal interconnection patterns.

9. A battery pack, comprising:
a battery cell;
a protective circuit board;
a terminal disposed on one side of the protective circuit board;
a positive temperature coefficient (PTC) device disposed on the one side of the protective circuit board, the PTC device comprising a PTC surface facing the battery cell;
a cell tab electrically coupled to the battery cell, the cell tab comprising a contact portion contacting the terminal, the contact portion interposed between the battery cell and the terminal, the contact portion of the cell tab comprising a cell tab surface facing the battery cell; and
an electrically-insulating heat-transfer member interposed between the battery cell and the protective circuit board, the electrically-insulating heat-transfer member contacting the cell tab surface and the PTC surface, thereby providing a thermal connection between the cell tab and the PTC device cell while electrically insulating the cell tab surface from the PTC surface, wherein the terminal extends beyond at least an edge of the cell tab, and the electrically-insulating heat-transfer member contacts both the cell tab and the terminal.

10. The battery pack of claim 9, wherein the cell tab is disposed on the terminal between the terminal and the battery cell.

11. The battery pack of claim 9, wherein the heat transfer member is disposed on both the cell tab and the PTC device.

12. The battery pack of claim 9, further comprising:
a frame case disposed between the battery cell and the protective circuit board.

13. The battery pack of claim 12, wherein the heat transfer member contacts the frame case.

14. The battery pack of claim 1, wherein the heat transfer member comprises a heat transfer layer having a first heat conductivity, a first adhesive layer interposed between the cell tab and the heat transfer layer, and a second adhesive layer interposed between the heat transfer layer and the battery cell, the second adhesive layer having a second heat conductivity substantially lower than the first heat conductivity.

15. The battery pack of claim 1, wherein the heat transfer layer comprises a thermally conductive acrylic foam tape.

16. The battery pack of claim 1, wherein the heat transfer layer comprises ceramic particles.

17. The battery pack of claim 1, wherein the heat transfer layer comprises pressure sensitive acrylics.

18. The battery pack of claim 1, wherein the heat transfer layer comprises a flame retardant.

19. The battery pack of claim 1, wherein the heat transfer member comprises a surface facing away from the battery cell, wherein both the cell tab surface and PTC surface contact the surface facing away from the battery cell.

20. The battery pack of claim 1, wherein the cell tab comprises a portion interposed between the internal terminal and the heat transfer member.

21. The battery pack of claim 1, wherein the heat transfer member comprises a first layer and a second layer, the first layer contacting both the cell tab surface and the PTC surface, the second layer being less heat conductive than the first layer.

22. The battery pack of claim 21, wherein the second layer comprises an adiabatic insulating material.

23. The battery pack of claim 22, wherein the second layer contacts a frame case that houses the battery cell.

24. The battery pack of claim 21, wherein the heat transfer member further comprises a third layer interposed between the first and second layers, the third layer comprising an electrically insulating and thermally conductive material.

25. The battery pack of claim 1, further comprising a frame case disposed at least between the battery cell and the protective circuit board, wherein the frame case comprises a plurality of support parts protruding toward the protective circuit board so as to provide a space, and the PTC device, the cell tab, and the heat transfer member are disposed in the space.

* * * * *